Dec. 3, 1963 W. S. CARSON, JR 3,112,732
FEEDER FOR CATTLE OR THE LIKE
Filed Dec. 22, 1961 2 Sheets-Sheet 1
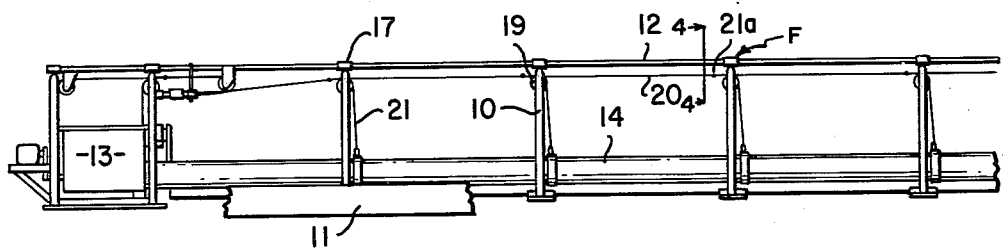
*Fig. 1*
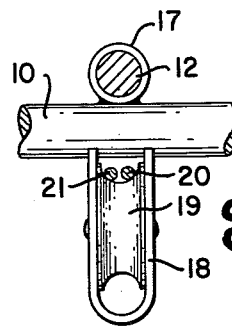
*Fig. 4*
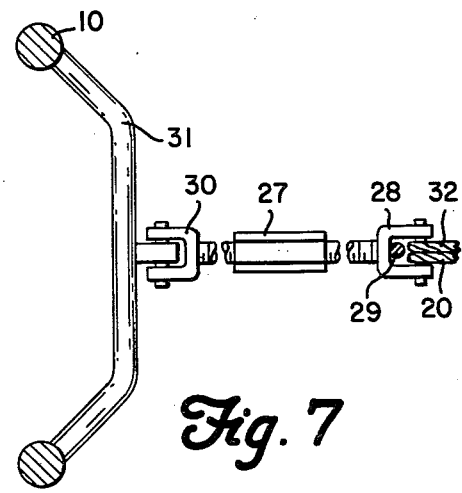
*Fig. 7*
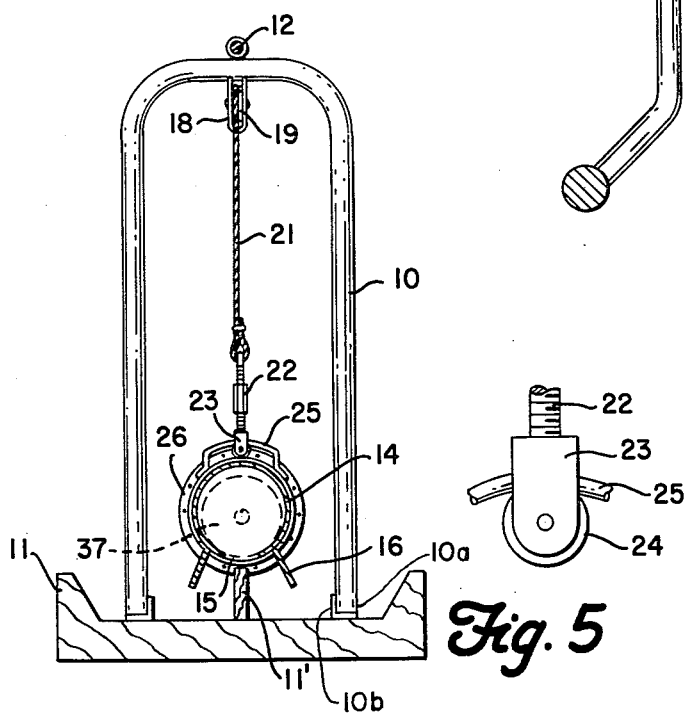
*Fig. 3*
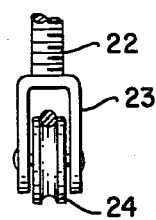
*Fig. 5*  *Fig. 6*
INVENTOR.
WILLIAM S. CARSON JR.
BY Malcolm W. Fraser
ATTORNEY Dec. 3, 1963   W. S. CARSON, JR   3,112,732
FEEDER FOR CATTLE OR THE LIKE
Filed Dec. 22, 1961   2 Sheets-Sheet 2

INVENTOR.
WILLIAM S. CARSON JR.
BY
Malcolm W. Fraser
ATTORNEY

United States Patent Office 3,112,732
Patented Dec. 3, 1963

3,112,732
FEEDER FOR CATTLE OR THE LIKE
William S. Carson, Jr., Swanton, Ohio
Filed Dec. 22, 1961, Ser. No. 161,451
1 Claim. (Cl. 119—52)

This invention relates to a feeder for cattle or the like in which the feed can if desired be taken from a silo and mechanically fed and distributed to an elongate trough accessible to a large number of cattle, swine or the like.

An object is to suspend the feed assembly including the hopper and feed tube in such manner that the assembly can be raised and lowered relative to the feed trough so that the volume of the feed delivered to the trough may be varied.

Another object is to suspend the feed assembly by cable means which can be adjusted vertically from a single source of power.

A further object is to provide leveling means for the long feed or delivery tube so that it may be of the same height throughout its length.

A still further object is to enable the feed tube to be rocked axially so that the amount of material discharged therefrom may be regulated on each side, this also enabling one type of feed to be delivered to one side of the feed trough and another to the opposite side.

A still further object is to improve the preliminary cutting of the feed before delivered to the feed conveyor and then deliver such feed to the main conveyor in an efficient manner.

Other objects and advantages of the invention will hereinafter appear and, for purposes of illustration but not of limitation an embodiment of the invention is shown on the accompanying drawings in which FIGURE 1 is a fragmentary side elevation of a feeder mechanism for cattle and the like, parts being broken away for purposes of clarity;

FIGURE 3 is an enlarged cross sectional view on the line 3—3 of FIGURE 2, showing one of the inverted U-shaped standards or supports and the means for connecting the suspending cable to the tube;

FIGURE 4 is an enlarged fragmentary sectional view on the line 4—4 of FIGURE 1 showing the mounting of a sheave between a ridge rail and the inverted U-shaped support.

FIGURE 5 is a fragmentary elevation on an enlarged scale showing the manner in which the suspending cable for the tube engages the bail carried by the tube;

FIGURE 6 is a view similar to FIGURE 5 only viewed from a different direction and showing the bail in cross section;

FIGURE 7 is a transverse sectional view taken on the line 7—7 of FIGURE 2 through one of the U-shaped supports and showing the manner in which the height adjusting turnbuckle is connected thereto;

Figure 2:
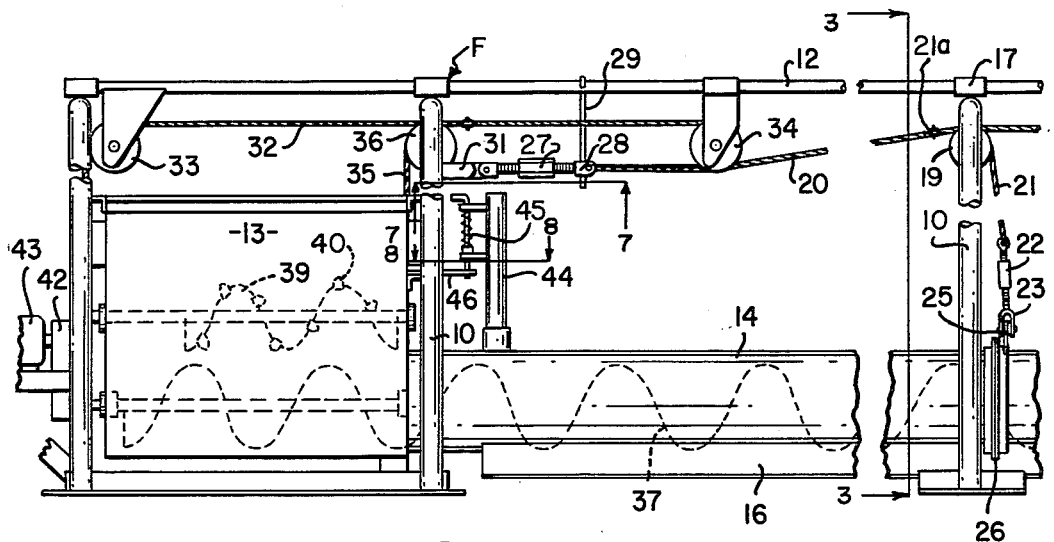
FIGURE 2 is an enlarged side elevation of the feeder mechanism showing the hopper and the height adjustment device as well as the device for axially rocking the feed tube, certain parts having been omitted.
Figures 8, 9:
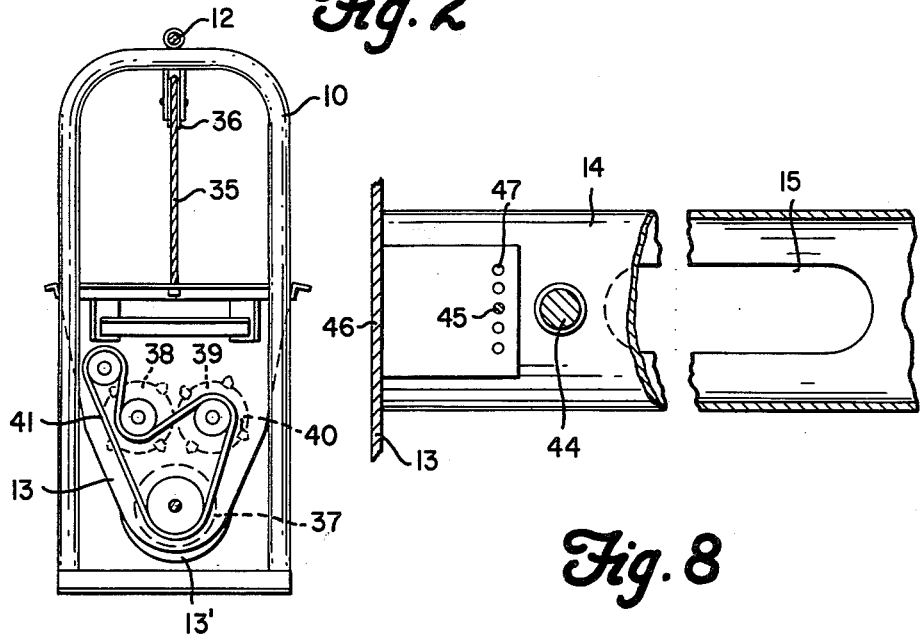
FIGURE 8 is an enlarged fragmentary sectional view on the line 8—8 of FIGURE 2 of a portion of the feed tube and the mechanism for axially rocking the feed tube in one direction or the other and securing it in the adjusted position.
FIGURE 9 is an end elevation of the feed hopper, parts being removed for purposes of clarity and showing the suspension for same.

The illustrated embodiment of the invention comprises a supporting frame F, the length of which may be selected in accordance with the demands of service, and, as shown, it comprises a plurality of laterally spaced inverted U-shaped supports 10, the bottom ends 10a of which are suitably secured by an angle iron 10b to a longitudinally elongate trough 11 which, as shown, is wooden. Above the top of the supports 10 is a horizontal ridge rail or rod 12.

Suitably connected for relative rotational movements to one side of the hopper 13 is an elongate metallic tube 14, the length of which is predetermined according to the demands of service. On the bottom side of the tube is a series of longitudinally elongate slots 15 suitably spaced from each other and providing the feed discharge opening from the tube. At each side of the bottom end of the tube and arranged at opposite sides of the slots 15 and extending continuously throughout the length of the tube is a pair of downwardly and outwardly inclined or flared skirts 16. Carried by the trough 11 and extending substantially throughout the length thereof, is a divider strip or upright panel 11'. As shown the divider strip 11' is disposed in the space between the outwardly flared skirts 16.

The hopper 13 and the horizontally extending feed tube 14 are flexibly suspended from the frame and, as shown, disposed in the region directly above each of the inverted U-shaped supports 10 is a welded sleeve 17 through which the ridge rail 12 extends. Directly beneath the cross part of each support 10 and welded thereto is a U-shaped sheave bracket 18 containing a sheave 19. Extending over the several sheaves 19 is a flexible cable 20 and secured to the cable 20 in the region of each of the sheaves 19 by a suitable clamp 21a is a feed tube suspending cable 21. The suspending cable 21 also passes about the adjacent sheave 19 and the lower end of the cable is looped to engage the eye of a turnbuckle 22, the opposite end of which is connected to a bracket 23 containing a grooved roller 24 engaging the underside of a bail 25 which is fixed to a flange member 26 projecting from the feed tube 14. It will be understood that the tube 14 can rock axially in one direction or the other, the bail 25 rolling along the respective roller 24 so that at all times the depending portion of the cable 21 is in a straight up and down position instead of being angled to one side or the other.

The entire length of the feed tube 14 may be raised or lowered through the means of the suspending cable 21 by a horizontally disposed turnbuckle 27 which at its forward end has a clevis 28 to which one end of the cable 20 is attached. To prevent the clevis 28 from turning when the turnbuckle 27 is actuated, a rod 29 extends through the clevis 28 and has its upper end hook shaped to hook over the adjacent portion of the ridge rail 12, as shown in FIGURE 2. At the opposite end of the turnbuckle 27 is a clevis 30 which is suitably pinned to a lug fixed to and projecting forwardly from a handle bar-shaped rod 31 the opposite ends of which are welded to the adjacent U-shaped support 10.

The hopper 13 is also cable suspended and, as shown, a cable 32 has one end portion passing around a sheave 34 suspended from the ridge rod 12 and is connected to the clevis 28. The opposite end portion of the cable 32 extends over a sheave 33 suspended from the ridge rail 12 and is suitably connected to an upper portion of the hopper. An additional cable 35 engages an opposite end portion of the hopper 13 and passes over a sheave 36 suitably fixed to the underside of the adjacent U-shaped support 10 and is clamped to the cable 32.

From the above description it will be manifest that actuation of the turnbuckle 27 in one direction or the other operates conjointly to raise or lower the feed tube 14 through the several suspending cables 21 for the feed tube and at the same time raise or lower the hopper 13 by the cables 32 and 35. Thus by a single adjustment the entire assembly may be adjusted vertically as desired.

A feed screw 37 extends the entire length of the feed tube 14 and has a portion disposed in the bottom portion of the hopper 13. Disposed within the hopper 13 and arranged above the feed tube 37 is a pair of knife-carrying helicoid flights 38 and 39, the knives thereon being indicated at 40. These are arranged with their axes parallel and are driven in such manner that one flight rotates in one direction and the other one in the opposite direction. A drive belt arrangement 41 is indicated for achieving this result. It will be observed from FIGURE 2 that the flights 38 and 39 are spaced somewhat from a left side of the hopper, the arrangement being such that the feed which is delivered to the hopper is cut up by the flights 38 and 39 through the agency of the knives 40 and gradually fed to the left of the figure or to the inner end of the screw 37 which then feeds the cut up feed to the tube 14. Thus it will be apparent that the belting 41 not only drives the helicoid flights 38 and 39 but also the screw 37 and suitably connected thereto is a series of reduction gears contained in the housing 42 and this is coupled to an electric motor 43 for providing the single source of power for operating the feeder.

To enable the feed tube 14 to be rocked circumferentially in one direction or the other an upright handle 44 is fixed to the upper side of the tube and this may be grasped and moved forwardly or rearwardly so as to turn the tube in one direction or the other. This enables the feed to be delivered wholly to one side or the other of the trough 11. By such rocking movement one or the other of the skirts 16 is brought close to the divider strip 11' to effect this result. This makes possible the feeding of one type of material to one side of the trough and another type of material to the opposite side of the trough. In order to secure the tube in the adjusted position a spring tensioned latch 45 is carried by the handle 44 and the latch may enter one or another of the row of holes 47 provided in the plate 46 secured to the side of the hopper 13.

From the above description it will be apparent that I have produced an extremely simple and inexpensive feeder for cattle or the like in which the feed tube is flexibly suspended from a frame work. The entire assembly including the feed tube 14 and the hopper 13 may be raised or lowered as desired from a single source of power. The tube may be adjusted to level condition by adjusting the several turnbuckles 22. By operating the handle 44 the feed tube 14 may be rocked to vary the discharge to the trough 11. A further feature of importance resides in the preliminary cutting up of the feed which is introduced into the hopper 13 by employing right and left hand operating knife-carrying helicoid flighting 38 and 39 which not only cuts up the feed into a size which is readily handled by the feed screw 37 but also delivers it to the inner end of the feed screw so that it can be efficiently handled.

Numerous changes in details of construction, arrangement and choice of materials may be effected without departing from the spirit of the invention especially as defined in the appended claim.

What I claim is:

In a feeder for cattle or the like, a horizontal feed tube apertured at the bottom for the discharge of feed, outwardly flared skirts on the sides of the tube discharge aperture respectively, an upright divider strip mounted between said skirts, a motor driven screw in said tube, a vertically disposed frame work, a main cable extending horizontally along the upper portion of said frame work, sheaves arranged along said frame work over which said cable passes, a series of suspending cables connected to said operating cable and said feed tube at spaced intervals, means for leveling said feed tube, said leveling means comprising a plurality of longitudinally spaced bails secured to said tube at the upper portion thereof, turnbuckles on the lower ends of said suspending cables respectively, rollers on said turnbuckles engaging said bails respectively, and means to rock said feed tube so that said bails move along said rollers respectively, thereby to rock one skirt toward and the other skirt away from said divider for controlling the discharge of material from the feed tube.

References Cited in the file of this patent

UNITED STATES PATENTS

| | | |
|---|---|---|
| 1,967,022 | Chandler | July 17, 1934 |
| 3,029,791 | Hacker | Apr. 17, 1962 |
| 3,033,163 | Hostetler et al. | May 8, 1962 |